Patented Sept. 21, 1954

2,689,847

UNITED STATES PATENT OFFICE 2,689,847

GLYCOSIDE OF α-NAPHTHYLAMINE-4-SULFONIC ACID

Antonio Esteve, Barcelona, Spain, assignor to Laboratories Om, Société Anonyme, Geneva, Switzerland, a corporation of Switzerland No Drawing. Application February 18, 1952, Serial No. 272,276

Claims priority, application Switzerland April 20, 1951

1 Claim. (Cl. 260—211.5)

The present invention relates to new derivatives of α-naphthylamine-4-sulphonic acid, endowed with therapeutic properties, and to a process for preparing same.

The said new derivatives answer to the formula

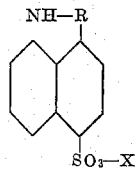

in which R is a carbohydrate radical, for example that of a monosaccharide such as glucose, galactose, xylose, that of a polysaccharide and X a hydrogen atom or an atom of a monovalent metal, such as sodium, or an equivalent of a polyvalent metal, such as calcium or an organic radical or again an amino or amido group.

These compounds are effective in the treatment and prevention of haemorrhages, they increase the speed of coagulation of the blood and reduce the bleeding time; furthermore, they are devoid of toxicity.

The process of preparation of these new derivatives of α-naphthylamine-4-sulphonic acid consists in condensating a carbohydrate with α-naphthylamine-4-sulphonic acid or one of its salts or one of its esters or one of its amides.

The said condensation may be carried out within a solvent, which may be water or preferably an anhydrous solvent; it may also be carried out in the absence of any solvent or other body. It may be carried out with the assistance of heat, in the presence of a dehydrating agent, such as ammonium chloride, potassium bisulphate, zinc chloride or another salt of similar properties.

How the process according to the invention may be carried out will now be explained, by way of example, in connection with the preparation of the glucoside of α-naphthylamine-4-sulphonate of sodium.

12.26 gr. of anhydrous α-naphthylamine-4-sulphonate of sodium is made to react with 10 gr. of anhydrous glucose, in 600 cm.³ of absolute alcohol in the presence of 1 gr. of ammonium chloride. This is heated to boiling point with reflux in a steam bath, while stirring the reactive mixture continually during two hours. The mixture is then allowed to cool, a crystalline mass is formed which is isolated by filtration, it is washed in alcohol and dried. A crystalline mass is obtained which is very soluble in water, little soluble in alcohol and in ether. This product decomposes without melting at 200° C., and its rotatory power is $$\left[\alpha\right]_D^{18°} = -95°$$

Its aqueous solutions are stable at ordinary temperature, even at low pH, as that of gastric juice.

Its constituting formula is as follows:

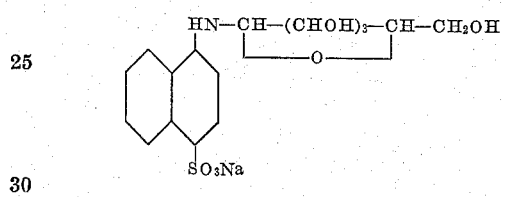

What I claim is:

The glucoside of α-naphthylamine-4-sulphonate of sodium.

References Cited in the file of this patent

UNITED STATES PATENTS

| Number | Name | Date |
|---|---|---|
| 2,141,843 | Meyer et al. | Dec. 27, 1938 |
| 2,167,719 | Klingel et al. | Aug. 1, 1939 |
| 2,193,433 | Salzberg | Mar. 12, 1940 |
| 2,268,780 | Shonle | Jan. 6, 1942 |